United States Patent [19]
Mathews

[11] 3,802,172
[45] Apr. 9, 1974

[54] HITCH CONNECTION FOR A TRACTOR DRAWN IMPLEMENT

[76] Inventor: Bernard C. Mathews, P.O. Box 70, Crystal Lake, Ill. 60014

[22] Filed: June 23, 1972

[21] Appl. No.: 265,579

[52] U.S. Cl.............. 56/15.8, 56/15.9, 56/504, 172/449, 172/501, 280/461 A
[51] Int. Cl............................................ A01d 49/00
[58] Field of Search............ 56/6, 7, 504, 15.7–15.9, 56/505; 172/449, 501; 280/456 A, 460 A, 461 A, 405 B, 505

[56] References Cited
UNITED STATES PATENTS
| | | | |
|---|---|---|---|
| 2,769,295 | 11/1956 | Northcote | 56/15.8 |
| 3,165,873 | 1/1965 | Iven | 56/DIG. 1 |
| 3,159,959 | 12/1964 | Mathews | 56/15.7 |
| 3,564,822 | 2/1971 | Engler | 56/6 X |

Primary Examiner—Louis G. Mancene
Assistant Examiner—J. A. Oliff
Attorney, Agent, or Firm—Bayard Jones; Foster York

[57] ABSTRACT

A mower has a mast and two support bars for connection to the upper and two lower links of a three point hitch. The mower frame has two support brackets to each of which one support bar is pivotally connected. The support brackets each include a stop flange to limit upward pivoted movement of the support bar so that elevation of the tractor lower links will transmit lifting force to the mower. During mowing, the low limit setting of the tractor lower links are set sufficiently low that independent movement of the support bars permit relative twisting of the tractor and the mower.

16 Claims, 9 Drawing Figures

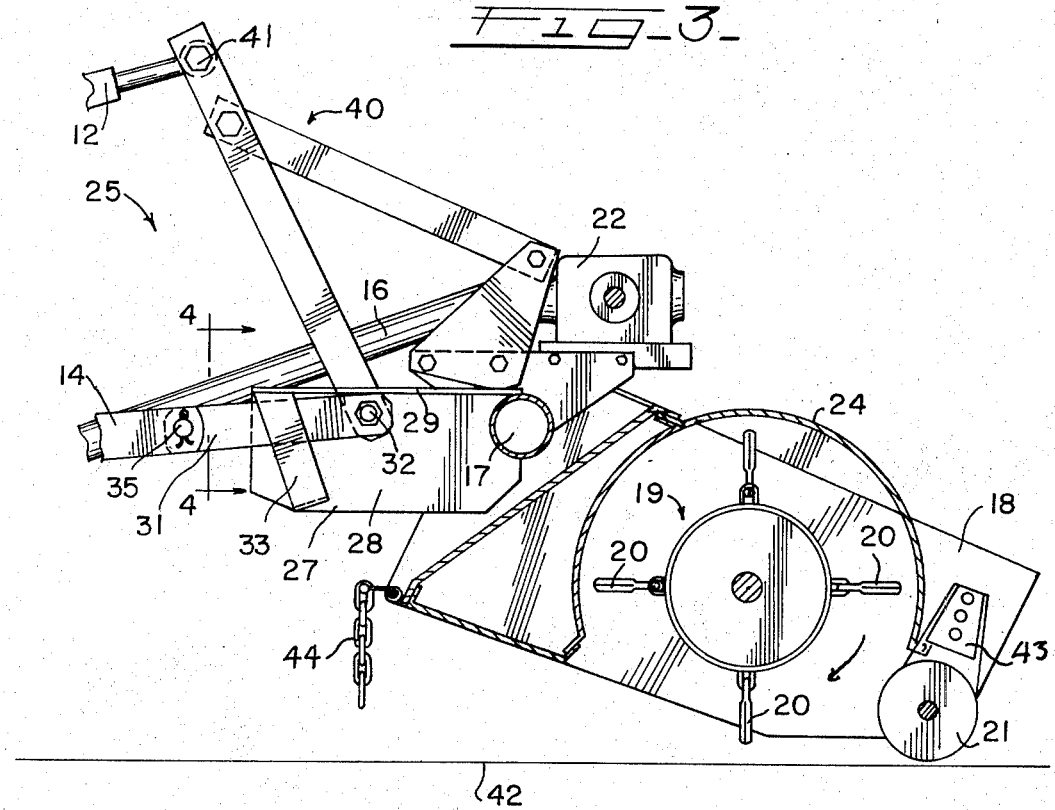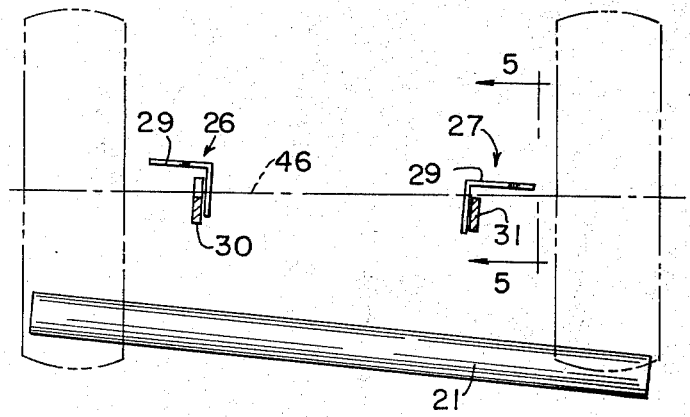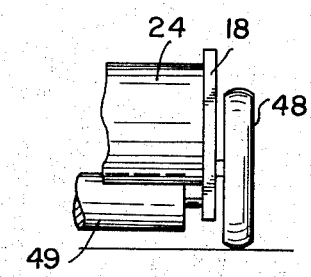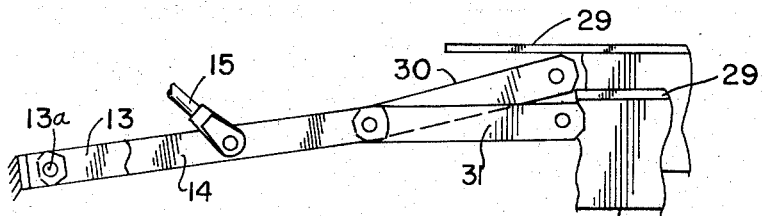

HITCH CONNECTION FOR A TRACTOR DRAWN IMPLEMENT

This invention relates to an improved hitch connection for a tractor drawn implement which is adapted for operation with a tractor having a three point hitch.

This type of implement is one that has a long roller or spaced wheels providing a rolling contact with the ground toward the rear of the implement, and in which the front of the implement is supported by the three point hitch.

My invention is described herein as applied to a mower of the type shown in my copending application, Ser. No. 214,816, filed Jan. 3, 1972, now U.S. Pat. No. 3,693,335, dated Sept. 16, 1972, although it is also applicable to numerous other implements, such as planters, sprayers and cultivators which have a two wheel rear support and a three point hitch support at the front.

One advantage of the three point hitch is that the mower may be elevated off of the ground during the turnaround at the end of the row. However, the usual hitch connection provided by such a mower would be three hitch points integrally mounted on the rigid mower frame. The objection to this arrangement is that both the roller and the spaced wheels provide laterally spaced ground contacting means which cause certain twisting motions of the tractor relative to the mower and vice versa. This imposes stresses on the mower frame which it is not capable of withstanding. This occurs when the tractor-mower combination cuts across swales or ridges diagonally.

I have found that it is possible to add additional articulation to the hitch to accommodate the relative twisting motions and still retain the advantage of elevating the mower off of the ground for turnaround or transport. I have also found that in spite of the additional articulation, it is possible to set the lower hitch links to a low limit position which is lower than the ordinary supporting position but in which the three point hitch still maintains the mower in an operative position.

According to my invention, the hitch connection for the lower hitch points comprises two support brackets, each having a pivoted support bar, the arrangement limiting the upward movement of each support bar so that the mower may be elevated off of the ground by raising the tractor lower hitch points.

Different tractors have different three point hitch constructions. In most hitches, the lower links are rigidly connected to each other so that they move only in unison with each other. The control sets only the lowermost position of the lower links. Thus, both links have free-floating movement above that point, but they do not have movement independent of each other. It is possible to obtain a special attachment which will permit one lower link to float upwardly independent of the other, the effect being similar to the replacement of the two power links with chains.

It is recognized that the twisting damage above described can be overcome by the use of a tractor equipped with the special attachment mentioned above. However, the fact is that in spite of warnings in the instruction manual and appearing on the mower itself, many purchasers use the wrong hitch, damage the mower, and then call on the manufacturer of the mower to repair the mower under the manufacturer's warranty. Therefore, for the protection of the manufacturer, it is advisable to build into the mower itself means to absorb those twisting motions which damage the mower.

My invention is particularly applicable to mowers for the reason that the terrain encountered in mowing is generally considerably rougher or more irregular than the terrain traversed by planters, sprayers and cultivators. Also, hay fields often have swales or shallow irrigation ditches, and adjacent fields are often separated by ridges, both of which must be traversed by a mower for economical operation. Furthermore, the problems encountered in mowing are different than in other implements. In a mower there is less tolerance for forward and downward tilting of the implement due to the possibility of scalping. Therefore it is desirable to provide a hitch connection the operation of which can be regulated to maintain an even height of cut.

Other objects, features and advantages will become apparent as the description proceeds.

In the drawings:

FIG. 3 is a sectional elevation taken along line 3—3 of FIG. 2;

FIG. 4 is a front view of the supporting means only showing the relative position of the certain elements when relative twisting occurs, the section being taken along line 4—4 of FIG. 3;

FIG. 5 is a side elevation taken along line 5—5 of FIG. 4;

FIG. 9 is a fragmentary rear elevation showing a modification.

Figure 1:
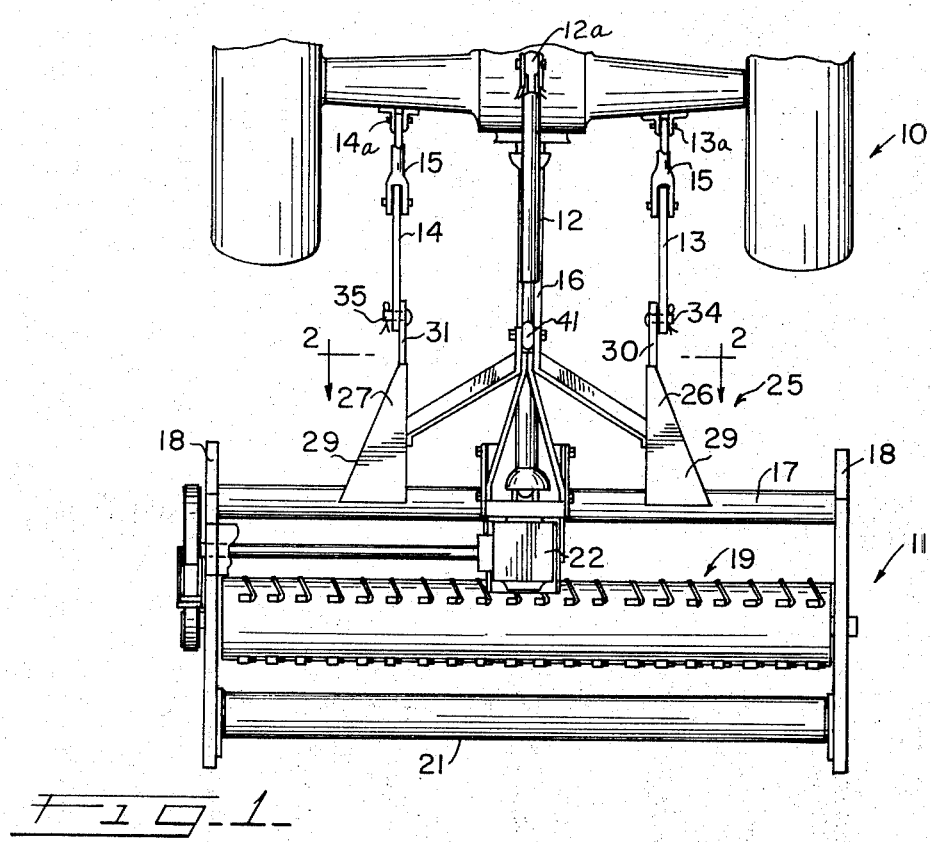
FIG. 1 is a plan view of a mower embodying my invention connected to the three point hitch of a tractor, the cover of the mower being removed.

FIG. 1 shows a tractor 10 having a three point hitch which is connected to a mower 11 having a hitch connection 25.

The three point hitch comprises an adjustable upper link 12, and two lower links 13 and 14, pivotally connected to the tractor structure at link points 12a, 13a, and 14a respectively. The lowermost position of the lower hitch points is determined by power links 15 which are connected to the lower links, whereas the upper link 12 has free movement. The terminology and operation of a three point hitch is described in SAE Standard J 715c. A power take-off (PTO) 16 extends between the tractor and the mower.

The mower comprises suitable structure, including a tubular front member 17 which is secured to side plates 18. A rotor 19 is journalled in the side plates and has pivotally mounted blades 20, as described in my aforesaid copending application. A gear box 22 is suitably supported from the front frame member 17 and receives the rear end of the PTO 16. Suitable drive mechanism 23 extends from the gear box 22 to the rotor 19. A suitable cover 24 encloses the rotor 19.

Figure 2:
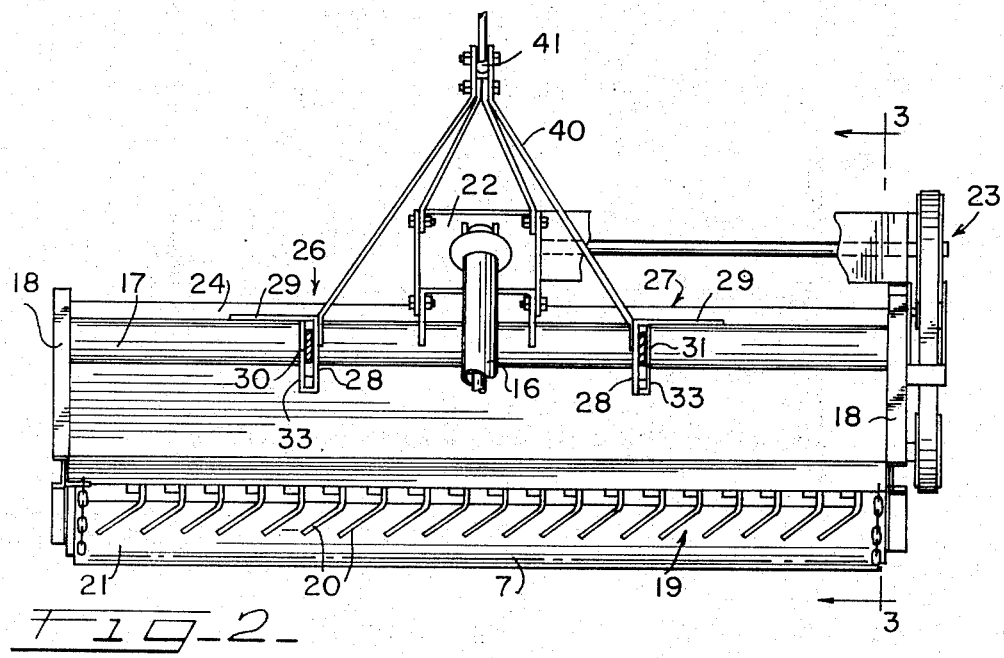
FIG. 2 is a front view of the mower taken along line 2—2 of FIG. 1.

The mower is supported on the ground at its rear end by suitable rolling contact means 21 which may be either in the form of a roller as shown in FIGS. 1 to 3, or in the form of wheels 48 as shown in FIG. 9. The front end of the mower is supported by the hitch connection 25, which will now be described.

The hitch connection comprises a pair of support brackets 26 and 27 which are carried by and structurally secured to the transverse front frame member 17. Each support bracket comprises a vertical web portion 28 and a horizontal stop flange 29. The hitch connection also includes a support bar 30, 31 for each bracket 26, 27, the support bar being pivotally mounted on the vertical web portion 28 by a pivot pin 32. A keeper 33 extends from the flange 29 to the lower portion of the web 28 and confines the support bar 30, 31 against horizontal movement away from the vertical web 28.

The front end of each support bar 30, 31 is connected to the rear end of the lower link 13, 14 by suitable means 34, 35. For clarity the connecting means are diagrammatically shown as pins, although in practice a ball-type joint as shown at 41 is used to accommodate the twisting that occurs. The geometrical location represented by the center line of the pins 34, 35 is commonly referred to as the "lower hitch point" which is common both to the lower links 13, 14 and to the support bars 30, 31. Reference numerals 34, 35 are also used herein to identify the two lower hitch points.

The mower also has a fabricated mast 40 which provides at its upper end the upper hitch point of the combination, the connection between the mast 40 and the link 12 preferably being in the form of a ball joint 41. The upper link 12 incorporates a turnbuckle arrangement for length adjustment. Adjustment of its length regulates the forward tilt of the mower, also referred to as the "aspect" of the mower.

The roller 21 is mounted on adjustable brackets 43 so as to regulate the height of cut. Such regulation will also modify the amount of forward tilt, which can be corrected by proper adjustment of the upper link 12.

In operation, the tractor 10 pulls the mower 11 through the links 12, 13 and 14, and power for driving the rotor is transmitted by PTO 16. At the end of the row, when the mower is to be elevated for turnaround, the links 13, 14 are elevated into the support positions shown in FIG. 6. The initial movement of the links causes the support bars 30, 31 to be rotated up into engagement with the flanges 29; further elevation of the links 13, 14 causes the mower to be elevated in essentially a translational movement which is a characteristic of a three point hitch. In this elevated position, the upper link 12 is tensioned, the lower links function primarily as cantilever beams, and the elements 30, 31 and 29 transmit the lifting force to the implement in flexure.

The operation of the hitch connection will now be described with reference to FIGS. 3, 4 and 5. For the purpose of explanation, the link points 13a, 14a can be assumed to be located at a lower elevation than the pivot pins 32. Thus, in the riding position of the mower, the links 13, 14 and the support bars 30, 31 are inclined downwardly in the forward direction, as shown in FIG. 3. This means that in the riding position, the support bars 30, 31 clear the stop flanges 29 and are free to swing upwardly as well as downwardly.

The low limit setting of the lower links 13, 14 is preferably set lower than the position represented in FIGS. 3 and 5 so as to permit free swinging movement of the links downwardly to the extent called for by the nature of the terrain.

I have found that the unbalanced weight distribution of the mower develops a tension in the lower links 13,14 and support bars 30, 31, and a compression in the upper hitch link 12. This constitutes a reactive couple which determines the riding position or aspect of the mower with the result that the aspect is not necessarily determined by the contact of the support bars 30,31 with the flanges 29.

Figure 7:
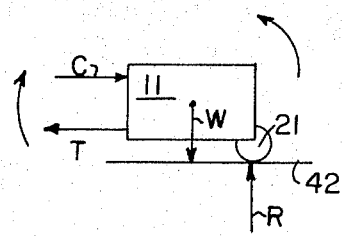
FIG. 7 is a force diagram illustrating the operation.

The action is illustrated in FIG. 7 in which the compressive and tensile forces C and T of the reactive couple opposes the couple W - R to determine the riding position of the mower 11. The force W represents the weight of the mower; R the reaction of the ground 42, C the compressive force of the upper link 12, and T the tensile forces in the lower links 13,14 and support bars 30,31.

Figure 6:
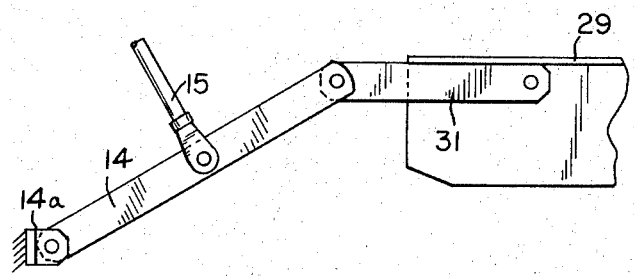
FIG. 6 is a view similar to FIG. 5, but showing a changed position.

Due to this position determining characteristic, I have found that my arrangement accommodates a much greater variety of twisting movements than if the low limit point of the lower links 13, 14 were set sufficiently high that the support for the front portion of the mower were provided by the engagement of one or both of the support bars 30, 31, with the flanges 29, as shown in FIG. 6.

When the tractor pulls the mower over a perfectly plane surface, the lower hitch links and support bars will be in the FIG. 3 position previously described, the tension causing the elements to assume a fully stretched position which brings them into alignment with each other.

A relative twisting of the tractor and the mower as shown in FIG. 4 causes the support bars 30, 31 to move out of their alignment with the lower links 13, 14 as shown in FIG. 5. Thus the angle between support bar 31 and the stop flange 29 of bracket 27 is decreased, and the angle between support bar 30 and the stop flange 29 of bracket 26 is increased. The lower links 13, 14 remain in a common plane which is parallel to the tractor axis 46. Since the low limit point of the lower hitch points is set below the FIG. 3 position, the common plane of the lower hitch links is free to rotate with respect to the link points 13a, 14a in either direction so as to provide, in conjunction with the support bars 30, 31, the "best average" straight line pull. The maximum twisting accommodation occurs where the low limit setting is considerably lower than the fully stretched orientation of FIG. 3.

It is, of course, not necessary that the lower link points 13a, 14a be at an elevation lower than the pivot pins 32 as long as the low limit setting of the lower links permits their downward swinging movement whenever twisting occurs. In such an arrangement, the tension in the lower links 13, 14 and the support bars 30, 31 will urge the latter upwardly into engagement with both stop flanges 29 if no twist were present. The presence of twist causes the lowermost stop flange 29 to urge downwardly the support bar 31 (compare with FIG. 4) which causes both lower links 13 and 14 to swing downwardly through a corresponding vertical distance. Assuming the non-horizontal component to be the mower, with the tractor axis 46 horizontal as in FIG. 4, then the two hitch points 34,35 will be of equal elevation. The support bar 30 drops downwardly away from its stop flange 29. In other words, the relationship of the support bars 30,31 to the respective stop flanges is substantially the same as shown in FIG. 5 irrespective of whether the lower links 13,14 are inclined upwardly and rearwardly from the link points, as shown, or downwardly and rearwardly.

I have found during experimentation that operators tend to use the bottommost low limit setting of the particular three point hitch, and to adjust the upper link 12 to provide a mower aspect resulting in from zero to 5° clearance between the riding orientation of the support bars 30, 31 and the stop flanges 29, as shown in FIG. 3.

However, the hitch connection, when designed for use with tractors having very high link points, should preferably have the brackets 26, 27 sufficiently high as to permit sufficient latitude of mower aspect adjustment as to provide at least a 5° clearance between the riding orientation of the support bars 30, 31 and the stop flanges 29. This means that with zero clearance, the extended longitudinal axis of the support bars will pass above the lower link points. The purpose of having some clearance is to avoid constant hammering of the support bars 30, 31 against the flanges 29.

Although, as pointed out hereinafter, the embodiment described is designed to accommodate the twist imposed by a 16 inch ridge or swale, normal ground irregularities of the magnitude of from two inches in lawns to four to 6 inches in fields are to be expected. When operating at zero or very small clearances at least one of the support bars 30, 31 swings away from and back into engagement with its stop flange resulting in an impact for each irregularity. Although the brackets 26, 27 are designed to withstand such hammering, it is preferred to operate the implement so that the normal range of irregularities are accommodated without hammering as described in connection with FIG. 5 in which a certain amount of free swinging independent movement of each support bar above and below a normal riding orientation can take place without contacting the stop flanges 29.

I have found that it is desirable to make the support bars 30, 31 sufficiently long as to permit for either one a down swing movement sufficient to accommodate a substantial twist, such as 13° which represents a 16 inch drop of one wheel in the 6 foot wide mower shown herein. For instance, in a category 1 three point hitch where the transverse spacing between the hitch points 34, 35 is substantially 27 inches, a support bar having a length between pivot centers 32, 34 of 10½ inches and a keeper 33 which permits a 6 inch vertical drop (33°) would accommodate a 13° twist. Thus, the length of the support bar between centers is 1/7 of the width of the mower, and the vertical drop of the down swing is substantially 1/12 of the mower width.

In a category 2 hitch, where the horizontal spacing between the hitch points 34, 35 is substantially 32.5 inches, then a seven inch vertical drop would be called for, and it would be desirable to have a somewhat longer support bar, equal, say, to one-fifth of the mower width.

The keepers 33 prevent lateral buckling of the elements 13, 30 or 14, 31 at the ball joint or hitch point 34, 35 when the implement is elevated. As shown in FIG. 2, each keeper 33 is an L-shaped member having its upright portion welded to the undersurface of the stop flange 29, and having its bent portion welded to the surface of vertical web 28 to form a slot-like enclosure of a width only slightly greater than the thickness of the support bar 30, 31. The support bar extends through said enclosure and is confined thereby against substantial lateral movement. In addition to the prevention of buckling, the keeper tends to localize any twisting at the hitch point so that the twist will be accommodated by the ball joint. This prevents the transmission of twisting stresses to the pivot pin 32.

The pivot pin is so located that when the support bar engages the stop flange 29, the upper edge of the support bar will engage the flange throughout a considerable portion of its length, thus distributing the lifting force over a substantial area when the mower is elevated. This also contributes to the ability to withstand hammering which sometimes occurs.

In some instances, the operator may not wish to elevate the mower at turnaround. This causes the mower to slide sidewise over the ground. Here, the combination of the web 28 and the keeper 33 of the support bracket 26, 27 provides a very rigid backing for the support bar 30, 31 which is sufficient to take up the lateral stress involved. It will be noted that the web 28 overlaps the major portion of the length of the support bar with the result that any lateral stress is confined to only a short length of projecting bar.

The roller 21 is located just behind the path of the knives 20 and is therefore well behind the transverse vertical plane passing through the center of gravity of the mower, which is somewhat ahead of the axis of the rotor 19. Any wheels used as an alternate to or in conjunction with the scalping roller should also support the mower well behind the center of gravity to maintain a stable stress couple in the three point hitch towing links.

Since the rotor 19 rotates into the crop, chains 44 may be provided to arrest the motion of forwardly thrown rocks.

Figure 8:
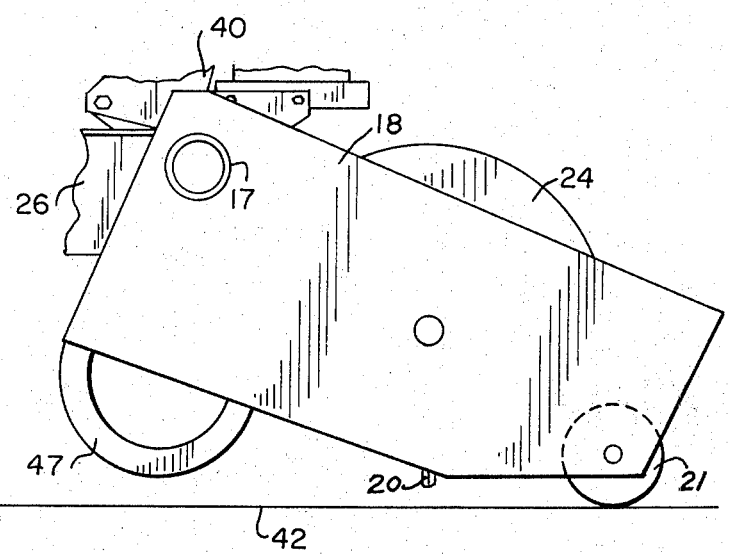
FIG. 8 is a side elevation showing a modification.

In the modification of FIG. 8, a skid 47 has been added to limit scalping when the mower is cutting up to a bank on which the tractor is riding. A proper low limit setting of the lower links 13, 14 will also guard against excessive scalping in this condition of operation.

In the modification of FIG. 9, the rolling ground contact means is in the form of wheels 48 mounted on the side plates 18, instead of the roller 21. Suitable means are provided for adjusting the elevation of the wheel axis to regulate the height of cut. An anti-scalping roller 49 may be provided, if desired, as shown in the aforesaid copending application.

Although only preferred embodiments of the present invention have been described herein, it will be understood that various modifications and changes may be made in the constructions shown without departing from the scope of the invention as pointed out in the appended claims.

I claim:

1. An implement adapted for connection to the three point hitch of a tractor, the three point hitch having two lower links extending rearwardly from link points and providing two lower hitch points, an upper link providing an upper hitch point, and power means for raising said lower links and providing for said lower links an adjustable low limit position, said implement comprising a frame, rolling ground contact means mounted in said frame for supporting the rear portion of said implement, said rolling ground contact means providing laterally spaced ground contacting means which causes a twisting of said implement relative to said tractor in traversing certain ground irregularities, two horizontally spaced support brackets rigidly mounted on said frame at the front portion thereof, a support bar pivotally mounted for vertical movement on each of said support brackets, stop means to limit upward pivoted movement of the front end of each pivoted support bar with respect to said support bracket, each support bar providing at its front end a lower hitch point for connection to said tractor lower hitch points, and mast means providing an upper hitch point for connection to said tractor upper hitch point.

2. An implement as claimed in claim 1 in which said stop means are located with respect to said lower link point to permit a limited amount of free swinging independent movement of each support bar above and below a normal riding orientation to accommodate continuously encountered types of relative twisting movement of said implement and said tractor without contacting said stop means, said stop means when engaged by said support bars also permitting a lifting force to be applied to said implement when said lower links are raised by said power means so that said implement may be elevated above the ground.

3. An implement as claimed in claim 2 in which the clearance between the normal riding orientation of said support bars and said stop means is substantially 5°.

4. An implement as claimed in claim 1 in which the orientation of each support bar in its stop engaging position is such that its extended longitudinal axis will pass above said lower link points, so that when said power means are set to provide a low limit position which is lower than a riding orientation in which said lower links and said support bars respectively are aligned with each other, said support bars will be clear of said stop means to permit a limited amount of free swinging independent movement of each support bar above and below a said riding orientation.

5. An implement as claimed in claim 1 in which each support bracket comprises a plate disposed in a vertical longitudinal plane, a pivot pin securing said support bar to said vertical plate, and in which said stop means comprises a horizontally extending flange at the top edge of said plate located above said support bar.

6. A mower adapted for connection to the three point hitch of a tractor, the three point hitch having two lower links extending rearwardly from lower link points providing two lower hitch points, an adjustable upper link providing an upper hitch point, and power means for raising said lower links and providing for said lower links an adjustable low limit position, said mower comprising a frame including a transverse front frame member and side plates, rolling ground contact means mounted on said side plates for supporting the rear portion of said mower, said rolling ground contact means providing laterally spaced ground contacting means which causes a twisting of said mower relative to said tractor in traversing certain ground irregularities, a rotor mounted in said side plates and including pivotally mounted blades which normally clear the ground, two horizontally spaced support brackets rigidly mounted on said front frame member and extending forwardly therefrom, a support bar pivotally mounted for vertical movement on each of said support brackets, stop means to limit upward pivoted movement of the front end of each pivoted support bar with respect to said support bracket and providing a high limit position in which said support bars support the front of said mower when elevated, each support bar providing at its front end a lower hitch point for connection to said tractor lower hitch points, mast means providing an upper hitch point for connection to said tractor upper hitch point, said mast and said support bars cooperating with said upper and lower links to maintain said mower in a riding position in which said blades are clear of the ground.

7. A mower as claimed in claim 6 in which the vertical cross sectional dimension of said support bars is substantially greater than the horizontal cross sectional dimension.

8. A mower as claimed in claim 6 in which said stop means are located with respect to said lower link points to permit adjustment of said upper link to provide a limited amount of free swinging independent movement of each support bar above and below its normal riding orientation incident to said mower and said tractor.

9. A mower as claimed in claim 6 in which each support bracket comprises a plate disposed in a vertical longitudinal plane, a pivot pin securing said support bar to said vertical plate, and in which said stop means comprises a horizontally extending flange at the top edge of said plate located above said support bar.

10. A mower as claimed in claim 6 in which said rolling ground contact means comprises a pair of wheels.

11. A mower as claimed in claim 6 in which the length of said support bars between centers is at least one-seventh of the width of the mower.

12. A mower as claimed in claim 6 which includes keeper means cooperating with said support brackets and said stop means for limiting the lateral movement of said support bars, said keeper means permitting a vertical drop of said mower lower hitch points equal to at least 1/12 of the mower width.

13. A mower as claimed in claim 6 in which said rolling ground contact means comprises a roller.

14. A mower adapted for connection to the three point hitch of a tractor, the three point hitch having two lower links extending rearwardly from lower link points providing two lower hitch points, an adjustable upper link providing an upper hitch point, and power means for raising said lower links and providing for said lower links an adjustable low limit position, said mower comprising a frame including a transverse front frame member and side plates, rolling ground contact means mounted on said side plates for supporting the rear portion of said mower, a rotor mounted in said side plates and including pivotally mounted blades which normally clear the ground, two horizontally spaced support brackets rigidly mounted on said front frame member and extending forwardly therefrom, a support bar pivotally mounted for vertical movement on each of said support brackets, stop means to limit upward pivoted movement of the front end of each pivoted support bar with respect to said support bracket and providing a high limit position in which said support bars support the front of said mower when elevated, each support bar providing at its front end a lower hitch point for connection to said tractor lower hitch points, mast means providing an upper hitch point for connection to said tractor upper hitch point, said mast and said support bars cooperating with said upper and lower links to maintain said mower in a riding position in which said blades are clear of the ground, the vertical cross sectional dimension of said support bars being substantially greater than the horizontal cross sectional dimension, each support bracket comprising a plate disposed in a vertical longitudinal plane, a pivot pin securing said support bar to said vertical plate, said stop means comprising a horizontally extending flange at the top edge of said plate located above said support bar and extending forwardly of said pivot pin for a substantial distance, said pivot pin being so located that when said support bar is in said high limit position, the upper edge of said support bar will engage said flange throughout said forwardly extending portion thereof.

15. A mower adapted for connection to the three point hitch of a tractor, the three point hitch having two lower links extending rearwardly from lower link points providing two lower hitch points, an adjustable upper link providing an upper hitch point, and power means for raising said lower links and providing for said lower links an adjustable low limit position, said mower comprising a frame including a transverse front frame member and side plates, rolling ground contact means mounted on said side plates for supporting the rear portion of said mower, a rotor mounted in said side plates and including pivotally mounted blades which normally clear the ground, two horizontally spaced support brackets rigidly mounted on said front frame member and extending forwardly therefrom, a support bar pivotally mounted for vertical movement on each of said support brackets, stop means to limit upward pivoted movement of the front end of each pivoted support bar with respect to said support bracket and providing a high limit position in which said support bars support the front of said mower when elevated, each support bar providing at its front end a lower hitch point for connection to said tractor lower hitch points, mast means providing an upper hitch point for connection to said tractor upper hitch point, said mast and said support bars cooperating with said upper and lower links to maintain said mower in a riding position in which said blades are clear of the ground, the vertical cross sectional dimension of said support bars being substantially greater than the horizontal cross sectional dimension, each support bracket comprising a plate disposed in a vertical longitudinal plane, a pivot pin securing said support bar to said vertical plate, said stop means comprising a horizontally extending flange at the top edge of said plate located above said support bar, an L-shaped keeper having its upright portion secured to the undersurface of said flange, and having its bent portion secured to the surface of said vertical plate, said upright portion cooperating with said vertical plate to form a slot-like enclosure of a width only slightly greater than the thickness of said support bar, said support bar extending through said enclosure and being confined thereby against substantial lateral and twisting movement but being free for substantial vertical pivoted movement.

16. A mower adapted for connection to the three point hitch of a tractor, the three point hitch having two lower links extending rearwardly from lower link points providing two lower hitch points, an adjustable upper link providing an upper hitch point, and power means for raising said lower links and providing for said lower links an adjustable low limit position, said mower comprising a frame including a transverse front frame member and side plates, rolling ground contact means mounted on said side plates for supporting the rear portion of said mower, a rotor mounted in said side plates and including pivotally mounted blades which normally clear the ground, two horizontally spaced support brackets rigidly mounted on said front frame member and extending forwardly therefrom, a support bar pivotally mounted for vertical movement on each of said support brackets, stop means to limit upward pivoted movement of the front end of each pivoted support bar with respect to said support bracket and providing a high limit position in which said support bars support the front of said mower when elevated, each support bar providing at its front end a lower hitch point for connection to said tractor lower hitch points, mast means providing an upper hitch point for connection to said tractor upper hitch point, said mast and said support bars cooperating with said upper and lower links to maintain said mower in a riding position in which said blades are clear of the ground, the vertical cross sectional dimension of said support bars being substantially greater than the horizontal cross sectional dimension, each support bracket comprising a plate disposed in a vertical longitudinal plane, a pivot pin securing said support bar to said vertical plate, and keeper means cooperating with said vertical plate to form a slot of a width only slightly greater than the thickness of said support bar, said support bar extending through said slot and being confined thereby against substantial lateral movement but being free for substantial vertical pivoted movement, said vertical plate and keeper overlapping the major portion of the length of their associated support bar so that lateral stress of said support bar occasioned by sidewise sliding movement of said mower will be confined to only a minor portion of the length of said support bars.

* * * * *